United States Patent [19]

Hirs

[11] 4,242,205
[45] Dec. 30, 1980

[54] TRAVELING BELT FILTER

[76] Inventor: Gene Hirs, 6865 Meadow Lake Dr., Birmingham, Mich. 48010

[21] Appl. No.: 47,396

[22] Filed: Jun. 11, 1979

Related U.S. Application Data

[63] Continuation-in-part of Ser. No. 9,725, Feb. 6, 1979, which is a continuation-in-part of Ser. No. 952,030, Oct. 16, 1978, abandoned.

[51] Int. Cl.³ .............................................. B01D 33/04
[52] U.S. Cl. .................................................. 210/400
[58] Field of Search ................... 210/66, 67, 77, 79, 210/97, 104, 105, 109, 111, 116, 130, 133, 138, 160, 400, 401, 406, 416 R, 526, DIG. 3; 162/256, 364; 198/849, 848

[56] References Cited

U.S. PATENT DOCUMENTS

| 1,332,305 | 3/1920 | Ross | 198/849 |
|---|---|---|---|
| 3,206,030 | 9/1965 | Estabrook | 210/138 |
| 3,506,128 | 4/1970 | Pashaian et al. | 210/400 |
| 3,570,674 | 3/1971 | Dahlem | 210/400 |
| 3,756,378 | 9/1973 | Kuehl et al. | 198/849 |

FOREIGN PATENT DOCUMENTS 847152  7/1970  Canada ................................. 210/400

Primary Examiner—Frank Sever
Attorney, Agent, or Firm—Cullen, Sloman, Cantor, Grauer, Scott & Rutherford

[57] ABSTRACT

A system for filtering contaminated liquid comprises a filter box submerged in a tank of contaminated liquid and provided with a perforate surface in its top wall. A conveyor-driven endless loop filter belt encompasses the filter box, with the pump-induced or static pressure differential between the tank and the filter box causing liquid to flow downward through the belt into the inlet opening. Control means are provided for automatically indexing the filter web in response to an excessive build-up of filter cake over the filter box inlet. The longitudinally extending edges of the filter web are held downwardly against the filter box by a chain which is selectively advanced with the web-driving chain by means of flight bars extending through the links of both chains. In one embodiment of the invention, the filter box is also provided with an inlet opening in its bottom wall, to increase the filtration capacity, and means are provided for resiliently biasing the hold-down chain upwardly against the longitudinal edges of the lower reach of the filter web, to prevent liquid from by-passing the filter web. A further embodiment of the present invention is adapted for the additional use of a disposable filter media, interposed between the endless loop filter web and the hold-down chain.

8 Claims, 10 Drawing Figures

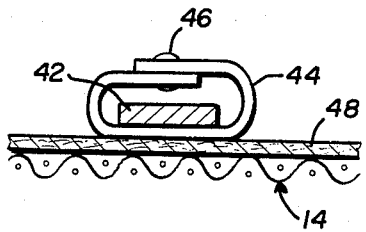
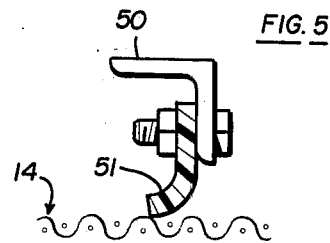
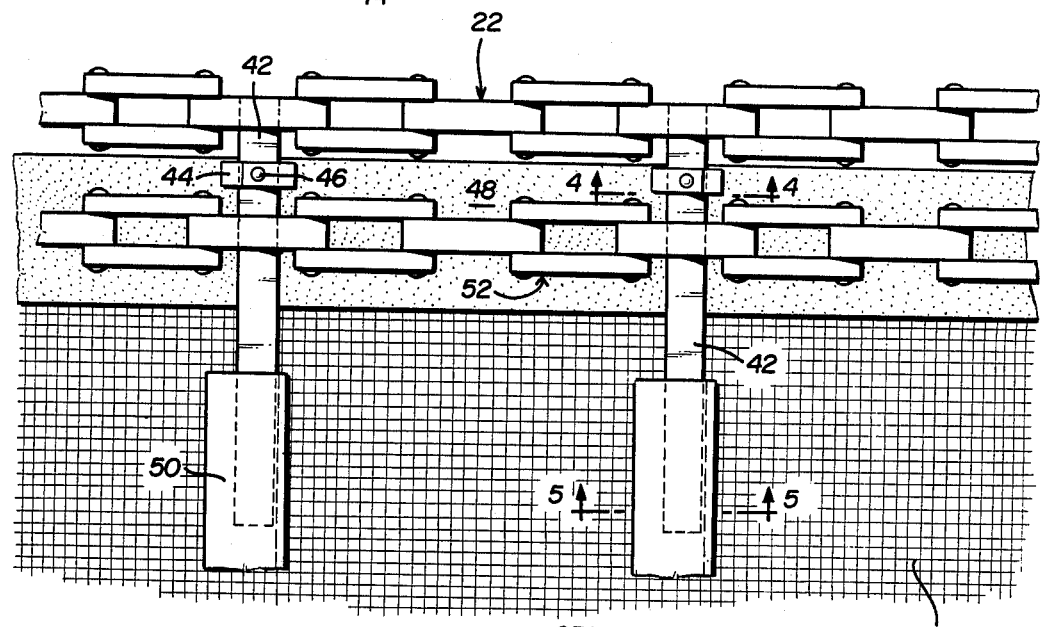
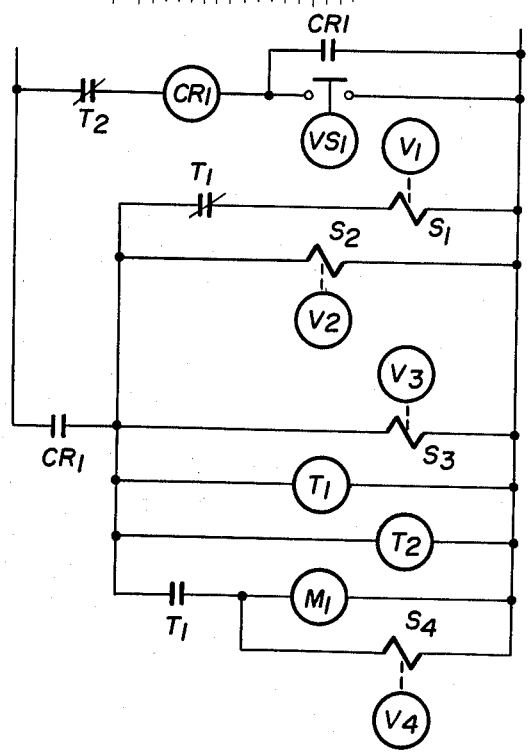

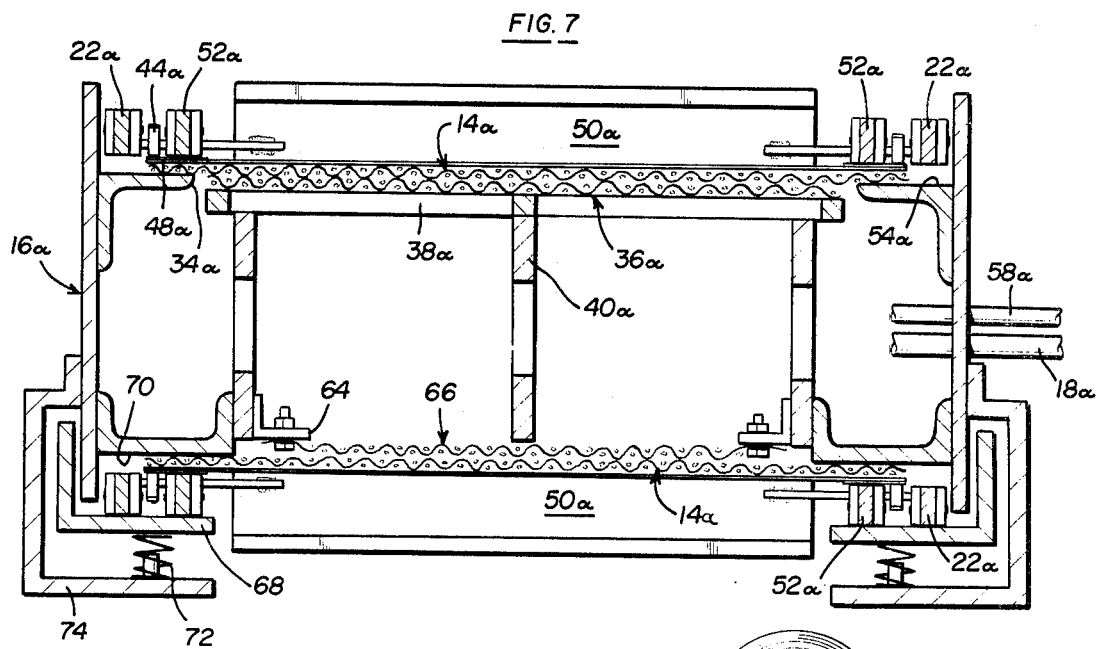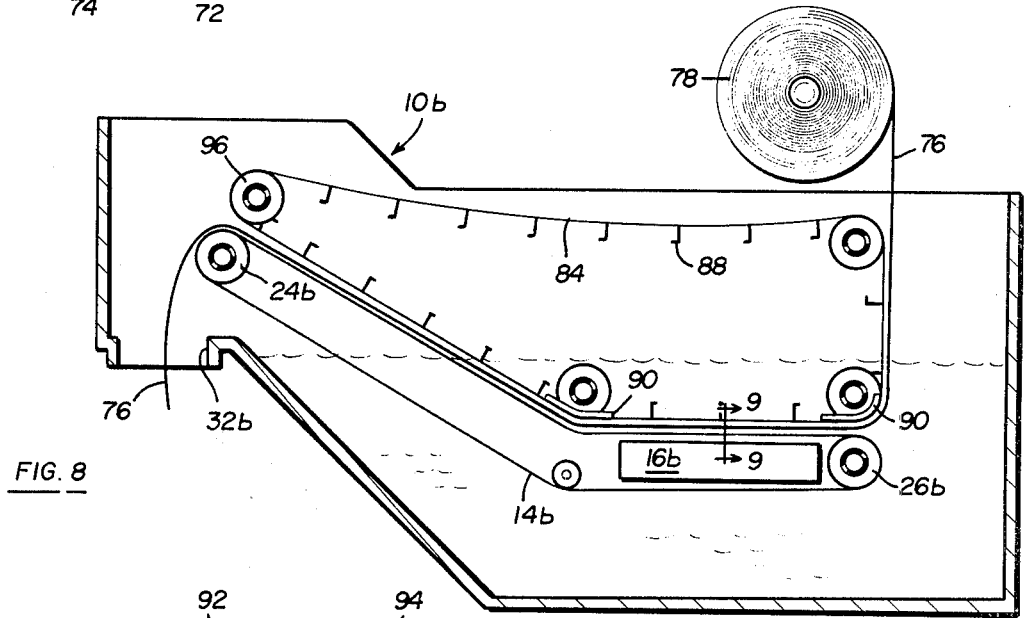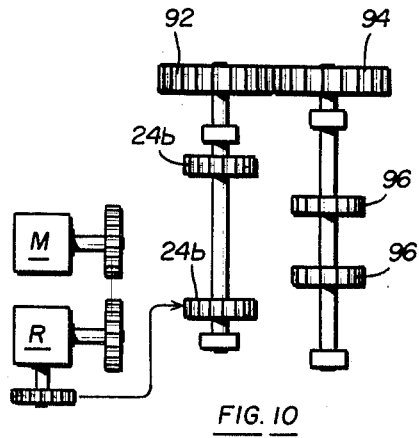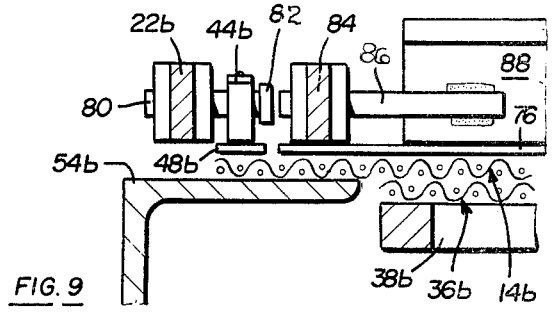

TRAVELING BELT FILTER

RELATED APPLICATION

This application is a continuation-in-part of my co-pending application Ser. No. 9,725, filed Feb. 6, 1979, which in turn was a continuation-in-part of Ser. No. 952,030, filed Oct. 16, 1978, now abandoned.

BACKGROUND OF INVENTION

A variety of filtering apparatus has been employed for the filtration of liquids such as coolants utilized in machining operations. One widely used type of system is the traveling belt filter, which lends itself to automation and permits a wide variety of filter media to be utilized. The media may be in the form of an expendable roll of cellulosic and/or polymeric material or it may be of a permanent type in the form of an endless belt which is cleaned at the point of dirt discharge by air blow-off or washer headers. These permanent media preferably consist of a square mesh polymeric mono-filament material.

The most common type of system utilized in coolant filtration is the intermittent traveling belt type, which may employ either a permanent or disposable media. A disposable media is generally carried on a relatively coarse endless perforate belt which does not perform a filtering function. The build-up of sludge on this type of filter forms a filter cake ⅛th inch to 2 inches high, and the filter cake itself acts as a fine filter which captures the dirt as the liquid penetrates the depth of the filter cake. However, the accumulation of the filter cake results in an increase of resistance to liquid flow through the media and the resulting pressure differential between the clean and dirty sides of the filter media can be one-half to twenty pounds per square inch. When a predetermined pressure drop has been sensed by the control system, liquid flow through the filter is interrupted and the media is indexed. During this indexing and cleaning of the filter media, the flow of filtered liquid is maintained from a large clean liquid well or simply by by-passing dirty coolant.

When the filter construction is in the form of a filter box submerged in a tank of liquid to be filtered and wherein the liquid is caused to flow through the filter media into an opening in the filter box by means of the differential pressure across the filter media, a significant factor contributing to the efficiency of filtration is the effectiveness of the seal between the filter media and the surface of the filter box. Particularly as the filter cake accumulates on the filter media, with resulting increased resistance to flow, any leakage path by which dirty liquid can by-pass the filter by entering the filter box from around the edges of the filter media, rather than through the filter media, will substantially reduce filtration efficiency.

This sealing problem is magnified when the filter is intended for machining coolant filtration applications, where the sludge which normally builds up on the filter media must be conveyed out of the unit. Because the filter box is submerged in the dirty liquid, it is necessary to have the filter media climb a ramp extending upwardly from the filter box to a higher elevation above the liquid level, where the accumulated sludge can be discharged outside the tank. These ramps generally are at about a 45 degree angle, and therefore angle flights connected to and spanning the gap between a pair of parallel chains are commonly used to help convey this sludge up the ramp.

Fabric type filter media are preferred in this type of filtration system, because stainless steel mesh belts are subject to fatigue and breakage as a result of the repeated flexing and bending of the screen as it passes around driving drums. Furthermore, stainless steel belts are extremely costly, and require elaborate slack take-up provisions resulting from differential expansion or elongation between the stainless steel belt and the driving chains.

While fabric filter belts are less expensive and easier to install, they produce their own problems. The repeated alternating exposure to liquid and air causes fabrics to shrink, a problem generally compensated for by installing an initially over sized belt. The system must also be able to counteract wrinkles that occur in the fabric. Furthermore, the low specific weight of the fabric requires means for forcibly holding the fabric down against the periphery of the filter box, to prevent by-passing and leakage, as discussed above. The flights which extend across the width of the filter box provide some hold-down effect, but their spacing of approximately one foot does not effectively hold down the lateral longitudinal edges of the fabric belt. It is difficult to have a resilient seal traveling with the edges of the belt because such seal must traverse the same drive sprockets or drums which the filter belt loop traverses. Stationary seals relying upon engagement with the intermittently moving belt are subject to wear and possible tearing of the fabric belt.

In my prior U.S. Pat. No. 3,087,620, a disposable filter media was both held down against the vacuum box and frictionally advanced by means of a pair of laterally spaced chains. Neither the filter media nor the chains circumscribed the filter box, and the chains did not positively connect to or drive the filter media or any supporting conveyor. In fact, a media or conveyor-driving chain could not effectively be used to also hold down the filter media because either (1) the necessity of a positive driving connection between the chain and supporting conveyor would preclude the overlying relationship between the chain and media carried on the conveyor, or (2) the media could not pass between the chain and its driving sprockets without becoming enmeshed in the sprocket and probably torn. The impracticality of such a hold-down chain would be particularly evident if used in an installation where the filter media and driving chain circumscribe a submerged filter box.

Accordingly, it is the principal object of the present invention to provide an improved sealing system for preventing leakage around the filter belt in a system of the type employing an endless filter belt surrounding a submerged filter box.

SUMMARY OF THE INVENTION

The longitudinal edges of the endless loop fabric filter web are held down in sealing engagement with the periphery of the upper inlet of the submerged filter box by means of a pair of holddown chains which travel with and are driven by the belt-driving chains located just beyond the lateral longitudinally-extending edges of the belt. The hold-down chains, located immediately adjacent the laterally inner side of the associated driving chains, are driven therefrom by means of flight bars which extend through the links of both pairs of chains. Therefore, the holddown chains do not engage any driving sprockets which would subject the filter media to damage.

A second embodiment of the invention provides a second inlet to the filter box located in the bottom surface, to increase the filtration capacity. Resilient means are provided to bias the hold-down chain upwardly against the lower reach of the endless filter web, to provide comparable edge sealing action.

A third embodiment of the invention utilizes the hold-down chain for providing an edge seal for a disposable filter media which is carried on and propelled by a conveyor which is driven by a separate pair of chains, with the hold-down chain being separately driven by sprockets forming a chain loop located entirely above the filter box and filter media.

BRIEF DESCRIPTION OF THE DRAWINGS

FIG. 3 is a fragmentary plan view of a portion of the filter media and chain drive of FIG. 1.

FIG. 4 is a side sectional view showing the driving connection between the filter belt and the flight bars, viewed in the direction of arrows 4—4 of FIG. 3.

FIG. 5 is a cross-sectional view of a typical flight bar, showing an optional resilient strip, viewed in the direction of arrows 5—5 of FIG. 3.

FIG. 6 is a schematic diagram of the control circuit for the system of FIG. 1.

FIG. 7 is a sectional view, similar to FIG. 2, but showing a second embodiment of the present invention.

FIG. 8 is a view similar to FIG. 1 showing a third embodiment of the present invention.

FIG. 9 is a view similar to FIG. 2, but fragmentary and on an enlarged scale, viewed in the direction of arrows 9—9 of FIG. 8.

FIG. 10 is a schematic diagram of the drive train for the system of FIG. 8.

DETAILED DESCRIPTION OF THE INVENTION

Figure 1:
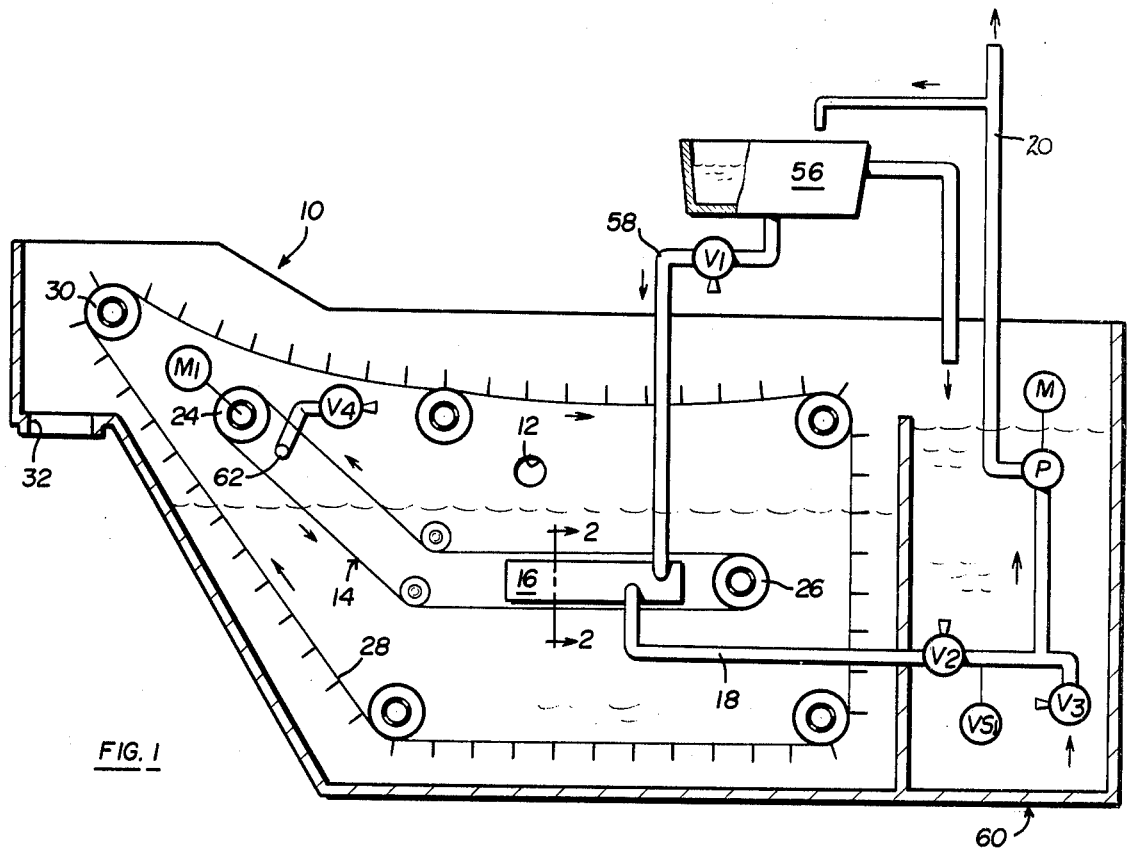
FIG. 1 is a simplified side elevation, partly in section, of a filtration system employing a first embodiment of the present invention.

Referring to FIG. 1 of the drawings, the filtering apparatus of the present invention generally comprises a tank 10 receiving dirty liquid from an inlet conduit 12, a power driven endless loop fabric filter belt 14 encircling filter box 16, an outlet pipe 18 leading from the filter box to the suction side of a pump P and return pipe 20 for returning fully filtered liquid to the source of the liquid.

Figure 2:
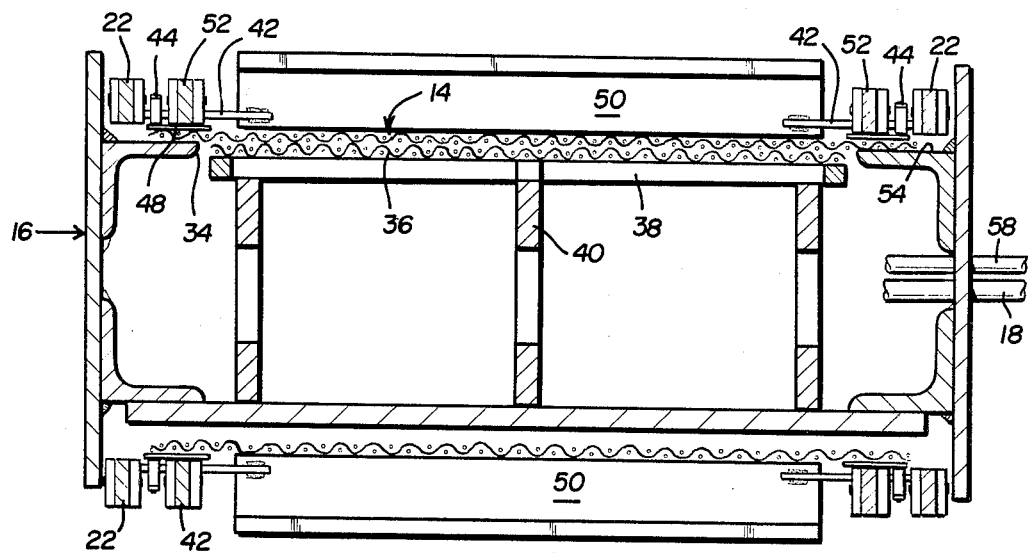
FIG. 2 is a sectional view through the filter box of FIG. 1, taken in the direction of arrows 2—2 of FIG. 1.

More specifically, as best shown in FIGS. 1–3, filter belt 14 is supported and pulled by a pair of laterally spaced driving chains 22 driven by a motor M1, appropriate speed reducers (not illustrated) and head sprockets 24. The path of chains 22 is determined by the position of tail sprockets 26 and appropriately spaced idlers. One type of chain which would be suitable for the present application is a rivetless drop forged chain manufactured by Moline Corporation, such as Moline chain No. 348 or 458.

As is conventional, a drag-out device 28 is provided in the form of a pair of laterally spaced chains power-driven from head shaft sprockets 30 (the associated motor and speed reducers are conventional and are not illustrated) and provided with interconnecting angle flights which scrape settled sludge along the bottom and inclined ramp of the tank to an exit port 32 from which the sludge is removed by gravity.

The construction of filter box 16 is best illustrated in FIG. 2, wherein it will be seen that upper inlet opening 34 is in the form of a perforated metal plate or wire mesh 36 supported by a horizontal grid structure 38 and supporting ribs 40. These elements can be secured to the main structure of the filter box by appropriate bolting or welding techniques, as will be appreciated by those skilled in the art.

Filter belt 14 is preferably fabricated of a permanent monofilament material. Depending upon the degree of filtrate clarity required, the mesh opening size may be selected within the range of about 0.005 to 0.035 inches.

As best shown in FIGS. 2–4, driving chains 22 are located laterally outwardly from the longitudinal edges of belt 14, so that there will be no interference between head sprocket 24 and the belt which would damage the belt. Spaced along the length of driving chains 22, at approximately one foot intervals, are flight bars 42 the ends of which slip fit within the link openings of driving chain 22. Filter belt 14 may be propelled by connection to a leading flight bar (unillustrated) which may, for example, be provided with hooks which engage grommets sewn into a reinforcing tape portion of belt 14 to pull the belt as the flight bar is advanced by chains 22. Filter belt 14 is also secured to flight bars 42 by means of straps 44 which encircle bars 42 and are snapped or otherwise secured as at 46. This arrangement functions to keep belt 14 in proper lateral alignment between chains 22. Straps 44 may be sewn to a strip of polypropylene tape 48 extending along each of the longitudinal edges of filter belt 14. The tape is sewn to the outer side of the filter belt loop, and the rubbing surface of the securing threads on the inner side of the belt loop can be treated with a polyurethane coating to reduce damage and wear to these threads.

As best shown in FIGS. 2, 3 and 5, the intermediate portion of flight bars 42 is in the form of a flight angle 50, which may be welded or otherwise attached to flight bars 42. As is conventional, flight angles 50 aid in holding the filter belt against the surface of the filter box and also aid in conveying accumulated sludge up the inclined portion of the filter belt loop for discharge from the tank. FIG. 5 shows the optional use of resilient rubber or urethane pressure strip 51 along each flight angle 50, dimensioned and positioned to be normally flexed in order to continuously apply pressure against filter belt 14. Strips 51 function to provide additional pressure aginst filter belt 14 to hold it in contact with the face of filter box 16. This optional feature may be particularly advantageous in the embodiment of FIG. 7, where the filter belt must be held upwardly against an optional inlet in the bottom wall of the filter box.

A pair of hold-down chains 52 is located between the pair of driving chains 22, and directly over tape portion 48 of filter belt 14. As can be seen from FIGS. 2 and 4, flight bars 42 extend through links of hold-down chains 52, and thereby provide the force to selectively advance the hold-down chains with driving chains 22, flight bars 42 and filter belt 14. The force of gravity acting downwardly on hold-down chains 52 will press the longitudinal edges of filter belt 14 downwardly against the top surface 54 of filter box 16, as best shown in FIG. 2. In this fashion, the desired seal between filter belt 14 and the periphery of inlet opening 34 of the filter box is achieved, to prevent dirty liquid from by-passing the filter belt as it enters the filter box.

As will be better understood from the description of the operation of the filter apparatus, a vacuum break tank 56 provides a source from which clean liquid may flow by gravity through conduit 58 to assist in breaking the vacuum in filter box 16, when required for the cleaning cycle of the filter. A clean liquid tank 60 is illustrated in FIG. 1, for a purpose to be explained below. A conventional belt washing header or nozzle 62 is provided for cleaning of the filter belt by pressurized water or air blowing outwardly from the inside of the belt loop, the displaced sludge being picked up by drag-out chain 28 for removal from the tank.

OPERATION

The following explanation should be read with reference to FIG. 1 and the schematic control circuit of FIG. 6. In normal filtering operation, filter belt 14 is stationary. Valve V2 in outlet pipe 18 is open, valve V1 between the vacuum break tank 56 and filter box 16 is closed, valve V3 (which provides an alternate source of liquid to pump P during cycling of the belt) is closed and valve V4 to belt washing header or nozzle 62 is closed.

Pump P establishes a reduced pressure in filter box 16, causing contaminated liquid in tank 10 to be drawn through filter belt 14 into upper inlet 34 of the box. From filter box 16, the liquid is pumped through outlet pipe 18 to return line 20. A small portion of this flow of clean liquid is by-passed to vacuum break tank 56, from which the overflow fills clean tank 60. Overflow from clean tank 60 pours into dirty liquid tank 10.

During filtering, an accumulation of filtered dirt builds up on the upper side of filter belt 14, and this filter cake enhances the degree of fine filtering provided by the system. Eventually, however, the depth and density of this accumulation excessively restricts liquid flow. The resulting build-up in pressure drop across the filter is indicated by a drop in pressure in outlet pipe 18 leading to the suction side of pump P. A sensor such as vacuum switch VS1 closes in response to this condition, energizing control relay CR1 and closing its associated contacts. Timers T1 and T2 are energized, as are solenoids S1, S2 and S3. Solenoid S1 opens valve V1 to permit liquid from vacuum break tank 56 to flow by gravity through conduit 58 to filter box 16 to break the vacuum therein and thereby prevent excessive drag on belt 14 against the perforated plate 36 in opening 34. Solenoid S2 closes discharge valve V2, and solenoid S3 opens normally closed by-pass valve V3 to allow pump P to draw clean liquid from clean tank 60 during the belt cleaning cycle, thereby maintaining the required flow of filtered coolant.

After a predetermined time delay, in the range from three to ten seconds, necessary for the vacuum break cycle to be completed, timer T1 energizes motor M1 to start driving chains 22, with resulting advance of filter belt 14. Simultaneously, with this event, solenoid S4 is energized to open normally closed valve V4 to commence the flow of compressed air or pressurized water to filter belt cleaning device 62. While most of the dirt falls off by gravity after going around the head shaft array, blow off device 62 further cleans the belt to make sure that the dirt has all been removed so that it can be carried out of the apparatus by drag-out chain 28. Timer T1 also de-energizes solenoid S1 to allow valve V1 to shut off flow from vacuum break tank 56.

A slightly longer predetermined time delay is set on timer T2, sufficient to allow belt 14 to travel far enough to remove the caked portion of the belt from the upper inlet opening 34. Upon expiration of such time delay, timer T2 opens relay circuit CR1, which in turn de-energizes solenoid S2, allowing valve V2 to open and flow to resume through the filter belt and filter box to pump P, stops belt motor M1, and de-energizes solenoids S3 and S4, thereby closing by-pass valve V3 and valve V4 which supplies belt cleaning nozzle 62. The system is then once again in its filtering mode.

While the invention has been illustrated and described as utilizing a pump to establish the required pressure drop across the filter belt, such pressure drop could alternatively be created by a static head of liquid resulting from having the clean tank located at a lower elevation than the dirty liquid tank.

MODIFIED EMBODIMENT OF FIG. 7

The construction shown in the modified embodiment of FIG. 7 is the same as shown in FIG. 1–6, except for the bottom wall of filter box 16. Accordingly, all reference numerals in FIG. 7 which refer to structure which is unchanged from FIG. 2 carry like refernce numerals, but with the "a" suffix added.

In FIG. 7, the bottom wall of filter box 16 is provided with a lower inlet opening 64, to increase the filtration capacity of the system. Submerged filter boxes with upper and lower inlet openings have been previously proposed, as in the patent to Dahlem, U.S. Pat. No. 3,570,674. However, the present construction offers substantially improved and simplified means for preventing by-pass or leakage around the filter belt.

Perforated plate 66 is mounted in lower inlet 64 to provide support for the lower reach of filter belt 14a when reduced pressure in the filter box tends to draw the belt upwardly into the box. Because gravity will tend to cause the lower reaches of hold-down chains 52a and filter belt 14a to fall downwardly away from the bottom of filter box 16, resilient means are provided for maintaining the necessary sealing action. Pressure plate 68 functions to resiliently bias hold-down chain 52a upwardly against the outer edges of the lower reach of filter belt 14a, thereby maintaining such portions of the filter belt into sealing engagement against bottom surface 70 of the filter box. For this purpose, compression springs 72 mounted on spring supporting plates 74 are provided. Pressure plate 68 may also be aided by the optional use of pressure strips 51 described above with reference to FIG. 5.

The construction shown in the embodiment of FIG. 7 functions to increase the flow rate of filtered liquid, without any increase in floor area consumed by the apparatus. At all times when pump P is drawing liquid from filter box 16 via conduit 18 and opened valve V2, dirty liquid will be drawn upwardly through filter belt 14 and into the filter box through lower inlet 64, thus augmenting the flow of filtered liquid from the upper opening.

MODIFIED EMBODIMENT OF FIGS. 8–10

FIG. 8 shows a further modified embodiment of the present invention, and omits for simplicity certain features common to the embodiment of FIG. 1 such as the drag-out chain, vacuum break tank, clean liquid tank and various valves, etc., it being understood that this embodiment could operate according to the same control system as described above. Similarly, this embodiment could also operate with or without the lower inlet opening in the filter box.

In FIGS. 8–10, structural elements which remain unchanged from the embodiment of FIG. 1 carry like reference numerals, but with the addition of the "b" suffix.

This embodiment permits an endless loop permanent filter belt 14b to be utilized with or without the additional use of a very fine disposable filter media 76. In many applications, extraordinary clarity of the fluid is not required and therefore the endless loop permanent filter belt could be used as the sole filter media. If fines started to accumulate in the system, the disposable filter media could be fed into the system for a period of time necessary to reduce the fine suspended level.

Disposable filter media must have very high wet strength, and are generally made from a non-woven polymeric material such as Dacron or nylon. With the use of a continuous or endless filter belt as the prime carrier and a top loop conveyor primarily as a hold down, a disposable filter media of substantially less wet strength can be used, because the filter would not be subject to such rigorous pulling action. For example, there are non-woven filter media made of cellulose fibers that are considerably less expensive than the polymeric materials.

However, because of the need to feed in the disposable filter media from a supply roll 78, and to dispose of the contaminated media once it has passed over the filter box, a different type of hold-down arrangement is required. That is, the embodiment of FIG. 2 would not provide any way to remove the disposable media from within the loop of hold-down chains 52.

For this purpose, chain attachments 80 extending through the links of driving chains 22b only project laterally inwardly far enough to provide a point of attachment for straps 44b which secure permanent filter belt 14b to chains 22b to be driven thereby. A flange 82 is provided on the inner end of attachments 80 to prevent straps 44b from slipping off.

Hold-down chains 84 are provided with attachments 86 which are welded to flight angle members 88, as in the embodiment of FIG. 1–6. Hold-down chains 84 are held downwardly in sealing engagement with the outer edges of disposable filter media 76 by means of guide members or brackets 90 located above filter box 16b.

As shown in the schematic diagram of FIG. 10, hold-down chain 84 is driven off the same motor and reducer unit used to drive driving chains 22b. However, additional gears 92, 94 are provided which drive hold-down drive sprockets 96 at the appropriate speed to cause both pairs of chains to travel at the same linear velocity.

Thus, it will be seen that the placement of the sprockets which drive hold-down chains 84 above the lower reach of such hold-down chains provides the necessary access for disposable filter media 76 to be fed into the vertical space between the hold-down chains and the permanent filter web, and to be removed therefrom when contaminated.

This invention may be further developed within the scope of the following claims. Accordingly, the foregoing specification is to be interpreted as illustrative of only three operative embodiments of the present invention, rather than in a strictly limited sense.

I now claim:

1. In a filtering apparatus of the type wherein contaminated liquid is supplied to a tank and caused by differential pressure to flow through a submerged perforate filter means into the inlet in the top wall of a submerged filter box, the filter means including an endless loop perforate filter belt which circumscribes the filter box, means for removing filtrate liquid from the filter box, and wherein a power driven conveyor selectively advances the normally stationary filter means in response to a build-up of dirt thereon to bring clean filter means into registry with a filter box inlet, the improvement which comprises:

the power-driven conveyor comprising a first pair of chains located adjacent the respective longitudinally extending edges of the filter belt and spaced laterally outwardly therefrom, and belt-attaching means securing the filter belt to said first pair of chains for advancing the filter belt therewith;

a second pair of chains located laterally inwardly from said first pair of chains engaging the upper surface of the longitudinally extending edges of the filter means to hold said edges downwardly against the upper surface of the filter box to provide a substantially liquid tight seal between said filter means and said filter box and to prevent liquid from by-passing the filter means as it enters the filter box inlet;

and driving means for selectively advancing said second pair of chains in unison with said first pair of chains and the filter belt means.

2. The filtering apparatus of claim 1 wherein said second pair of chains is connected to and driven by said first pair of chains.

3. The filtering apparatus of claim 2 wherein the driving connection between said two pair of chains comprises flight bars extending laterally inwardly from said first pair of chains and drivingly engaging said second pair of chains.

4. The filtering apparatus of claim 3 wherein said flight bars span the full width of the space between said first pair of chains, with each flight bar being connected to both chains of said first pair of chains, said flight bars being provided with resilient means which contact the filter means along lines transverse to the longitudinal edges of the filter means to bias the filter means into engagement with the filter box.

5. The filtering apparatus of claim 1 wherein the filtering means further includes a disposable perforate filter web which is superimposed over and supported by the upper reach of the filter belt, said second pair of chains engaging the upper surface of the longitudinally extending edges of said filter web to hold said edges downwardly against the upper surface of the filter box, and drive means for causing said filter web to selectively advance in unison with the filter belt.

6. The filtering apparatus of claim 5 wherein said second pair of chains is arranged in a loop located wholly above the filter box.

7. The filtering apparatus of claim 1 wherein the filter box is provided with a supplementary inlet opening in its bottom wall, and further including resilient means for biasing said second pair of chains upwardly against the lower reach of the filter means to hold the edges thereof upwardly against the bottom wall of the filter box to prevent liquid from by-passing the filter means as it enters the bottom inlet opening of the filter box.

8. In a filtering apparatus of the type wherein contaminated liquid is supplied to a tank and caused by differential pressure to flow through a submerged perforate filter means into the inlet in the top wall of a submerged filter box, the filter means including an endless loop perforate filter belt which circumscribes the filter box, means for removing filtrate liquid from the filter box, and wherein a power driven conveyor selectively advances the normally stationary filter means in response to a build-up of dirt thereon to bring clean filter means into registry with a filter box inlet, the improvement which comprises:

the power-driven conveyor comprising a first pair of chains formed in a closed loop located adjacent the respective longitudinally extending edges of the filter belt and spaced laterally outwardly therefrom, and belt-attaching means securing the filter belt to said first pair of chains for advancing the filter belt therewith;

a closed loop longitudinally extending sealing means connected to said power driven conveyor for movement with said filter belt, said sealing means engaging the longitudinal edges of said filter belt to urge said edges into sealing engagement with the top wall of the filter box;

and said filter belt being formed of non-metallic fabric material.

* * * * *